April 24, 1934.     J. V. O. PALM     1,956,468
BEARING MANUFACTURE
Filed Oct. 1, 1930
Fig. 1.
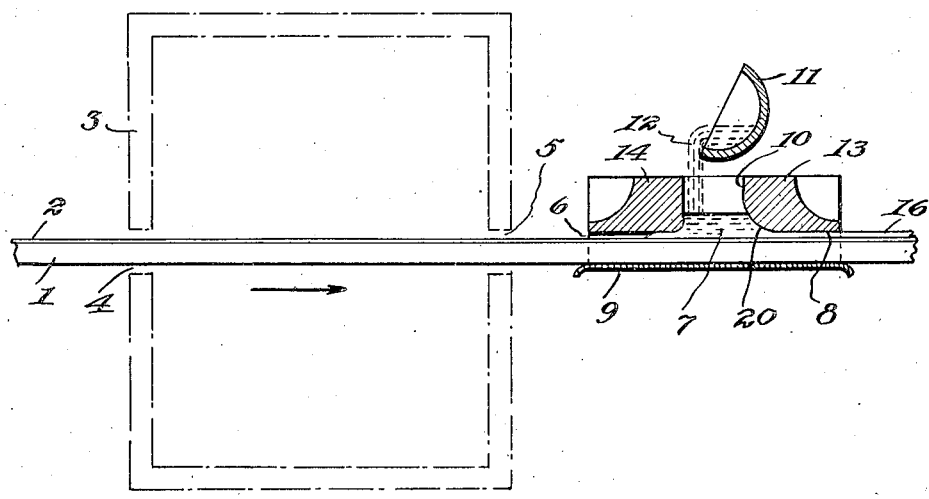
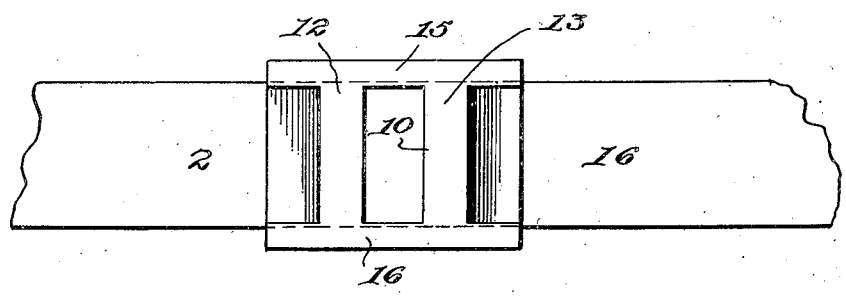
Fig. 2.
Inventor
John V. O. Palm
By Fay Oberlin & Fay
Attorneys Patented Apr. 24, 1934

1,956,468

UNITED STATES PATENT OFFICE 1,956,468

BEARING MANUFACTURE

John V. O. Palm, Cleveland Heights, Ohio, assignor to The Cleveland Graphite Bronze Company, Cleveland, Ohio, a corporation of Ohio Application October 1, 1930, Serial No. 485,697

4 Claims. (Cl. 29—149.5)

This invention, relating, as indicated, to bearing manufacture is more particularly directed to a novel method of producing journal bearings, as distinguished from ball and roller bearings.

Ordinarily, the housings which receive bearings are castings and the bearing material which may be babbitt is poured against the housing, this process being quite costly because of the fact that the babbitt must be of considerable thickness, due to the irregularity of the cast housing surface, and also because the housings are sometimes of relatively large proportions, and placing them in a position to line with babbitt is an expensive and awkward process. The thick layer of babbitt in such bearings of the prior art is also objectionable because babbitt is soft and a thick layer is subject to distortion from radial pressure more easily than a thin lining of babbitt backed with hard material.

A second well known method, which has supplanted to a large extent the above mentioned pouring method, in the bearing industry is to line a thick layer of brass with babbitt, but the resulting bearing is very expensive because of the cost of the brass. It has been found that steel may be lined with babbitt or bronze, and that the thickness of the steel as compared with that of the brass may be materially reduced. The resulting bearing is very cheap to produce as far as the materials are concerned, but the problem is how to unite these two metals, which have such different properties, so that the cost of such union plus the cost of materials is less than the total cost of a lined housing or a lined brass backed bearing. I have found that either bronze, or babbitt, or other suitable bearing material in the form of strips may be united to steel, and that this thickness of the babbitt or equivalent bearing material may be materially reduced and yet such a bearing will outlast a thick, cast bearing, and in the event of replacement the cost is only a fraction of what is would be under former conditions.

A further and important objection to replacing worn out bearings by casting is that the process of casting, being carried out in small shops under all sorts of conditions, produces a bearing lining the structure of which is far from uniform as compared to a lining produced in the factory under controlled conditions, where the bearing has a structure of just the desired character. This will be appreciated by taking the main bearing of an automobile, for example, which is usually cast in the block. If this bearing becomes worn the block has to be taken out, all the old babbitt removed, and then the bearing housing is cast with babbitt. With the use of my improved thin wall bearings all of this labor is avoided and the cost of material is less, since part of the space which was formerly occupied by babbitt, a very expensive material, is now taken up by steel. The reference to the use of my bearing in an automobile is only intended as a means of illustration and I do not wish to be limited to the use of my improved bearing in automobiles.

In this particular instance, I have aimed to provide a process of manufacturing bearings in which strip bearing material consisting of three layers, namely, steel, solder and babbitt, is formed and these three layers are integrally united by merely superimposing a strip of solder on a strip of steel and then pouring molten babbitt upon the solder in such a manner that no auxiliary means are necessary to produce a union between the babbitt and steel. I have used the terms "babbitt", "steel" and "solder", but obviously other metals may be substituted, such as bronze for babbitt, where this particular bearing material is desired.

The annexed drawing and the following description set forth in detail one method and certain mechanism embodying the invention, such disclosed method and means constituting, however, but one of various mechanical forms in which the principle of the invention may be used.

In said annexed drawing:—

Fig. 1 is a side elevation with parts in section; and Fig. 2 is a top plan view of the pouring gate shown in Fig. 1.

Referring now to the drawing, a strip of steel is shown at 1, having superimposed thereon a strip of solder 2, passing through a heat chamber shown at 3, the entrance to such chamber being designated 4, and the exit 5. It will be readily understood that this specific means of heating need not be followed as the strips could be heated by burners or other means, the important factor being to heat the strips just prior to their entrance in the pouring gate mechanism. A pouring gate is shown having an entrance 6 and an exit 8, there being a throat portion 10 located mid-way between the entrance and exit and situated directly above the strip. The pouring gate has a lower portion 9 upon which the steel strip 1 rides, since it is forced downwardly by pressure of the molten babbitt 7. The pouring means which I have termed a pouring gate consists of two vertical longitudinal walls 15 and 16 rising from the base 9, these walls having transverse connecting partitions 12 and 13. A ladle is shown suspended above the throat 10 from which a charge of molten babbitt 12 descends to form a surplus as shown at 7. The partition 13 has a gradually curved interior surface 20 which merges with the vertical throat portion 10 and the horizontal sizing opening 8, and this partition may be made adjustable in order to insure the proper thickness of the strip 16 of babbitt. The partition 14 on its interior surface is also curved but the curvature in this instance is not as gradual as that shown at 20 in order to retard spreading of the surplus molten metal 7 in a forward direction. The pouring gate may be of one piece construction or may be an assembly of the various parts, the main object being to provide a means of pouring molten metal upon a moving strip so that a layer of said metal is formed upon said strip. A further object is to form a layer of uniform structure and of any desired thickness for any of the various forms of casting which are used in other present day methods. The entrance 6 has a width which is just a fraction greater than the width of the steel strip 1, and this width is the same from entrance to exit, thus preventing the formation of rough edges on the completed strip and also preventing waste of any of the poured metal. The vertical dimension of the entrance 6 does not have to be accurately proportioned and merely a clearance need be provided to insure free movement of the strip 1. After the molten metal falls and accumulates as shown, a portion of it tends to spread in a forward direction, that is, toward the entrance 6 and then this portion adhering to the strip 1 moves toward the exit 8, thus causing a turbulence in the molten metal and preventing solidification thereof. It will consequently be seen that a turning over of the metal or working thereof is accomplished, which tends to render it suitable for packing into a uniform layer by the surface 20. As stated before, the partition 13 may be made in such a manner that it is freely adjustable in a vertical plane, the chief function of said partition being to pack the metal and regulate the thickness of the topmost strip. Positive packing action is afforded by providing the gradually curved surface 20 which is maintained in an extremely smooth condition to impart a smooth surface to the babbitt or other bearing material.

The method of forming a bearing according to my improved process is as follows:—

A strip of steel is unwound from a reel (not shown) and led through a heat chamber, said strip having superimposed thereon another strip of bonding metal such as solder. After the strips have been heated to the point where the solder reaches the stage of plasticity they are then fed into a pouring gate where a surplus of babbitt is accumulated upon the solder. As the strips move they carry the surplus along with them, and this surplus engages a gradually restricted opening formed by the surface 20 which cooperates with the movement of the strip to pack the babbitt and press it downwardly against the steel. The amount of babbitt is regulated by the size of the opening 8 and a composite strip of steel, solder and babbitt is produced. This strip is then blanked out to the required size and the blanks are formed into either whole or half round bearings.

The foregoing description discloses that my process provides a very efficient means of forming bearings without the necessity of separate bonding means, that is, a layer of bearing lining material may be poured so that an integral union results. The process also includes regulation of the poured metal both as to consistency and thickness, whereas the prior methods entailed more apparatus and further steps to insure this result. Another improvement will be observed in that in the replacement of worn out bearings the use of my improved bearing costs materially less and provides a more uniform bearing than the old hand pouring methods, which it is aimed to supplant.

Other forms may be employed embodying the features of my invention instead of the one here explained, change being made in the form or construction; provided the elements stated by any of the following claims or the equivalent of such stated elements be employed, whether produced by my preferred method or by others embodying steps equivalent to those stated in the following claims.

I therefore particularly point out and distinctly claim as my invention:—

1. In the method of manufacturing bearings, the steps which consist in superimposing a strip of solder on a strip of steel, heating said strips to a temperature at which the solder becomes plastic, pouring a layer of molten babbitt upon said strip of solder, moving said strips and poured babbitt through a passage, gradually decreasing in thickness, to form a bonded composite strip of bearing material.

2. In a continuous process of forming strip material adapted to be blanked and formed into bearings, the steps which consist in heating a strip of steel having a strip of solder superimposed thereon, pouring a surplus of babbitt upon said strips, a portion of said babbitt being permitted to flow in a forward direction on said strips, and then moving the strips through a gradually restricted opening to compact and bond the babbitt, solder and steel into one composite strip.

3. In a continuous process of forming strip material adapted to be blanked and formed into bearings, the steps which consist in heating a strip of steel having a strip of solder superimposed thereon, applying a surplus of molten babbitt upon said strips, and slidably compacting said babbitt on the surface of said strip by means of moving said strip through a gradually converging passage-way.

4. The method of manufacturing bearings, the steps which consist in superimposing a strip of solder on a strip of steel, heating said strips to a temperature at which the solder becomes plastic, pouring a layer of molten babbitt upon said strip of solder, permitting a portion of such babbitt to flow in a forward direction, partially retarding the forward flow of such babbitt, and then slidably compacting said babbitt on the surface of said strip by means of moving said strip through a gradually converging passageway.

JOHN V. O. PALM.